United States Patent Office 2,836,601
Patented May 27, 1958

2,836,601
DECARBOXYLATION TREATMENT

Godfrey Wilbert, Carmel, N. Y., Leo Reich, North Arlington, N. J., and Wesley Swigert, Central Valley, N. Y., assignors, by mesne assignments, to Warner-Lambert Pharmaceutical Company, Morris Plains, N. J., a corporation of Delaware No Drawing. Application February 9, 1956
Serial No. 564,589

1 Claim. (Cl. 260—295.5)

This invention relates to a process for the preparation of esters of pyridine carboxylic acids, and relates more particularly to a novel process for the production of pyridine carboxylic acid esters from pyridine dicarboxylic acids.

An object of this invention is the provision of an improved process for decarboxylating isocinchomeronic acid whereby nicotinic acid is obtained.

Another object of this invention is to provide an improved process for the production of nicotinic acid esters from isocinchomeronic acid in which the decarboxylation of isocinchomeronic acid is carried out in a reaction medium adapted to effect the esterification of the nicotinic acid formed.

Other objects of this invention will appear from the following detailed description.

Niacin and niacinamide are widely recognized and employed as nutritional factors in the prevention and treatment of pellagra. These compounds have been made available synthetically by various chemical processes. One of the more practical methods for synthesizing niacin, also known as nicotinic acid, involves the oxidation of aldehyde collidine, or 2-methyl-5-ethyl pyridine, with nitric acid. During this oxidation process the corresponding 2,5-pyridine dicarboxylic acid is formed. Under suitable heating conditions, especially at higher temperatures, the dicarboxylic acid, also known as isocinchomeronic acid, undergoes decarboxylation during the course of the oxidation to form niacin. In the process described in Swiss Patent No. 234,588 niacin is obtained directly with the decarboxylation taking place in the nitric acid oxidation medium itself without any separation of the isocinchomeronic acid formed. The optimum reaction conditions for oxidation and decarboxylation are not analogous. The oxidation proceeds most favorably at temperatures of from about 175 to about 195° C. while decarboxylation, although it will take place at temperatures within this range, is more easily and more rapidly effected at higher temperatures. A balance of the advantages of a separate decarboxylation over the combined oxidation and decarboxylation favors separate decarboxylation, especially where nitric acid is employed, due not only to the excessive corrosion experienced with nitric acid at the higher temperatures where decarboxylation is most rapid, but also to possible decomposition under the drastic conditions inherent whenever nitric acid is used at high temperatures.

The separate decarboxylation of isocinchomeronic acid has been carried out successfully in various inert media including acetic acid, water, sulfuric acid and mineral oil, and the reaction conditions for substantially complete decarboxylation to niacin are, essentially, a suitable combination of time and temperature.

In producing certain niacin derivatives such as niacinamide, for example, an important intermediate step comprises the esterification of the niacin to form a lower alkyl ester, such as the methyl, ethyl, propyl, isopropyl or butyl ester. Niacinamide is formed by an ammonolysis reaction which comprises heating the niacin ester with ammonia. Thus, in the usual process for producing niacinamide, the conversion of isocinchomeronic acid to niacin and the esterification of the niacin comprise two separate and distinct steps in the process.

We have now found, however, that isocinchomeronic acid may be decarboxylated and the niacin formed simultaneously esterified if the decarboxylation is carried out in a medium comprising a lower aliphatic alcohol, said reaction medium preferably containing up to 25% by weight of water on the weight of the lower aliphatic alcohol. The presence of water in the reaction mixture has been found to repress esterification of the α-carboxyl group on the dicarboxylic acid and thus ensures maximum decarboxylation.

Decarboxylation and esterification are effected by heating the reaction mixture of isocinchomeronic acid, lower aliphatic alcohol and water to a temperature of 180 to 250° C. and maintaining the reaction mixture at this temperature for from 2 to 5 hours.

In order further to illustrate our invention but without being limited thereto, the following examples are given:

Example I 100 parts by weight of isocinchomeronic acid are added to 405 parts by weight of n-butanol containing 50 parts by weight of water and the mixture heated under autogenous pressure at 200° C. for 3½ hours. The reaction product is then cooled. Decarboxylation to niacin is found to be 98% complete with 70% of the niacin produced being esterified to form n-butyl nicotinate. About 1.5% of the isocinchomeronic acid is esterified to form di-n-butyl-isocinchomeronate.

Example II 100 parts by weight of isocinchomeronic acid are added to a solution of 75 parts by weight of water in 405 parts by weight of n-butanol and the mixture heated at 200° C. for 3½ hours while maintaining the pressure at 300 pounds per square inch gauge. The reaction mixture formed is cooled and, by assay, the degree of decarboxylation to niacin is found to be 99.5% complete of which 34% is esterified to form n-butyl nicotinate. About 0.5% of the isocinchomeronic acid is unreacted.

It is understood that the foregoing detailed description is given merely by way of illustration and that many variations may be made therein without departing from the spirit of our invention.

Having described our invention, what we desire to secure by Letters Patent is:

Process for the production of n-butyl nicotinate, which comprises heating isocinchomeronic acid under autogenous pressure to a decarboxylating temperature of 180 to 250° C. in a reaction medium comprising n-butanol and containing from 12 to 25% by weight of water on the weight of the n-butanol.

References Cited in the file of this patent

UNITED STATES PATENTS

| | | |
|---|---|---|
| 2,389,065 | Lee et al. | Nov. 13, 1945 |
| 2,702,802 | Aries | Feb. 22, 1955 |
| 2,721,202 | Wirz | Oct. 18, 1955 |

FOREIGN PATENTS

| | | |
|---|---|---|
| 724,256 | Great Britain | Feb. 16, 1955 |